(12) United States Patent
Sakurai et al.

(10) Patent No.: US 10,589,590 B2
(45) Date of Patent: Mar. 17, 2020

(54) STABILIZER FOR VEHICLE

(71) Applicant: NHK SPRING CO., LTD., Yokohama-shi, Kanagawa (JP)

(72) Inventors: Yasuharu Sakurai, Yokohama (JP); Yoshihiro Koshita, Yokohama (JP); Akihiko Nishikawa, Yokohama (JP); Akifumi Otani, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 188 days.

(21) Appl. No.: 15/942,078

(22) Filed: Mar. 30, 2018

(65) Prior Publication Data

US 2018/0222267 A1 Aug. 9, 2018

Related U.S. Application Data

(63) Continuation of application No. PCT/JP2016/078910, filed on Sep. 29, 2016.

(30) Foreign Application Priority Data

Oct. 2, 2015 (JP) .................................. 2015-196909

(51) Int. Cl.
*B60G 11/18* (2006.01)
*B60G 21/055* (2006.01)
(Continued)

(52) U.S. Cl.
CPC ............ *B60G 11/183* (2013.01); *B05C 13/02* (2013.01); *B60G 21/055* (2013.01);
(Continued)

(58) Field of Classification Search
CPC .............. B60G 21/055; B60G 21/0551; B60G 2202/135; B60G 2206/427;
(Continued)

(56) References Cited

U.S. PATENT DOCUMENTS 6,547,894 B1 * 4/2003 Smith .................. B60G 21/055
148/521
7,896,983 B2 * 3/2011 Koyama ................. B23P 15/00
148/519
(Continued)

FOREIGN PATENT DOCUMENTS

JP 53110640 A 9/1978
JP 56153130 A * 11/1981 ......... B60G 21/0551
(Continued)

OTHER PUBLICATIONS

International Search Report (ISR) dated Nov. 22, 2016 issued in International Application No. PCT/JP2016/078910.
(Continued)

*Primary Examiner* — Laura Freedman
(74) *Attorney, Agent, or Firm* — Holtz, Holtz & Volek PC

(57) ABSTRACT

A stabilizer includes a stabilizer main body, and eyes formed on both ends of the stabilizer main body. Through-holes are formed in fastening surfaces of the eyes, respectively. The stabilizer main body is covered with a main body coating film. The eye is covered with an eye coating film whose thickness is less than a thickness of the main body coating film. An inner surface of the through-hole is covered with an inner surface coating film. An incomplete coating portion is formed at a part of the inner surface of the through-hole in a circumferential direction. The incomplete coating portion is located on an extension of a straight line connecting a center of the through-hole and the center of gravity of the stabilizer main body in a side view of the stabilizer main body.

4 Claims, 6 Drawing Sheets

(51) Int. Cl.
  *B05C 13/02* (2006.01)
  *B05D 1/12* (2006.01)
(52) U.S. Cl.
  CPC ............ *B60G 21/0551* (2013.01); *B05D 1/12* (2013.01); *B60G 2202/135* (2013.01); *B60G 2206/427* (2013.01); *B60G 2206/72* (2013.01); *B60G 2206/80* (2013.01)
(58) Field of Classification Search
  CPC ............ B60G 2206/72; B60G 2206/80; B60G 11/183; B05C 13/02; B05D 1/12
  See application file for complete search history.

(56) References Cited

U.S. PATENT DOCUMENTS

| | | | | |
|---|---|---|---|---|
| 8,356,825 | B2* | 1/2013 | Kuroda | B60G 21/0551 |
| | | | | 280/124.106 |
| 9,969,238 | B2* | 5/2018 | Kuroda | B60G 21/055 |
| 10,144,264 | B2* | 12/2018 | Mucher | B60G 21/0551 |
| 10,415,110 | B2* | 9/2019 | Wakabayashi | C21D 9/08 |
| 10,442,269 | B2* | 10/2019 | Wakabayashi | B60G 21/055 |
| 2003/0173001 | A1* | 9/2003 | Smith | B60G 21/055 |
| | | | | 148/521 |
| 2005/0011592 | A1* | 1/2005 | Smith | B60G 21/055 |
| | | | | 148/519 |
| 2013/0093153 | A1 | 4/2013 | Ito et al. | |
| 2018/0229250 | A1* | 8/2018 | Sakurai | B05B 13/0264 |
| 2018/0229576 | A1* | 8/2018 | Sakurai | B21D 53/88 |

FOREIGN PATENT DOCUMENTS

| | | |
|---|---|---|
| JP | 6447464 A | 2/1989 |
| JP | 07237428 A | 9/1995 |
| JP | 2000255624 A | 9/2000 |
| JP | 2002331326 A | 11/2002 |
| JP | 2007307511 A | 11/2007 |
| JP | 2011189892 A | 9/2011 |

OTHER PUBLICATIONS

Written Opinion dated Nov. 22, 2016 issued in International Application No. PCT/JP2016/078910.

* cited by examiner

STABILIZER FOR VEHICLE

CROSS-REFERENCE TO RELATED APPLICATIONS

This application is a Continuation Application of PCT Application No. PCT/JP2016/078910, filed Sep. 29, 2016 and based upon and claiming the benefit of priority from prior Japanese Patent Application No. 2015-196909, filed Oct. 2, 2015, the entire contents of all of which are incorporated herein by reference.

BACKGROUND OF THE INVENTION

1. Field of the Invention

The present invention relates to a vehicle stabilizer arranged in a suspension mechanism part of a vehicle such as a car.

2. Description of the Related Art

A stabilizer arranged in the suspension mechanism part of the vehicle is formed of a steel pipe or a solid rod-shaped steel material. The stabilizer includes a torsion portion (a twisted portion) extending in a width direction of the vehicle, and a pair of arm portions (arms) connected to both ends of the torsion portion via bent portions. On a distal end of each of the arm portions, an eye is formed. In an example of the suspension mechanism part, the torsion portion of the stabilizer is supported by a vehicle body via a rubber bushing, etc. The eye is connected to a suspension arm, etc., via a connecting member such as a stabilizer link. With respect to the stabilizer fitted in the suspension mechanism part, as the arm portion, the bent portion, and the torsion portion function as a spring in reaction to a rolling behavior of the vehicle body, roll stiffness of the vehicle can be enhanced.

For example, in a hollow stabilizer described in Patent Literature 1 (JP 7-237428 A), by flattening both ends of a steel pipe, a pair of eyes are formed. On the eyes, flat-shaped fastening surfaces are formed, respectively, and through-holes are formed in the respective fastening surfaces. In each of the through-holes, a connecting member such as a bolt or a stabilizer link is inserted. The eve is connected to a suspension mechanism member such as the suspension arm through the connecting member.

In one example of a method of manufacturing a stabilizer described in Patent Literature 2 (JP 2002-331326 A), a coating film is formed by a coating process on a surface of the stabilizer formed of a steel pipe. In one example of the coating process, electrostatic dry spray coating or fluidized bed coating using powder paint is adopted. By this coating, a coating film is formed on a surface of the steel pipe at a substantially even thickness. In particular, a steel material surface of a stabilizer main body (a torsion portion, a bent portion, and an arm portion) is covered with a coating film formed to have a thickness as uniform as possible. In a conventional coating process, the so-called "one-eye hang", which is to support one of the eyes on both ends of the stabilizer by a hanger, and to suspend the stabilizer in a vertical position by its own weight, was commonly adopted.

In the coating process of the stabilizer, when the powder paint is sprayed toward the stabilizer by a spray nozzle, part of the powder paint, enters the inner side of the through-hole of the eye. Accordingly, a coating film that is substantially similar to the one on an outer surface of the eye is formed on an inner surface of the through-hole. For example, coating may be performed in a state (one-eye hang) in which one of the eyes is supported by the hanger and the stabilizer is suspended in a vertical position by its own weight. In such a case, since the eye on the lower side does not contact the hanger, a substantially uniform coating film is formed on the lower eye. In contrast, since the hanger contact the eye on the upper side, a place where the paint does not adhere is formed on an unspecified part of the eye. In other words, a trace of contact of the hanger is left on only one of the eyes located at the both sides. When the paint is sprayed in a state in which the stabilizer is suspended in a vertical position (one-eye hang), injected powder paint tends to flow from top to bottom. Accordingly, a thickness of the coating film on the lower eye becomes greater than that of the coating film on the upper eye. For these reasons, the thicknesses of the coating films differ in one eye and the other eye, and the coating quality is adversely affected.

Other than the above coating process, in a manufacturing process or for storage of the stabilizer, the stabilizer may be handled in such a state (one-eye hang) that the hanger is inserted into one of the eyes, and the stabilizer is suspended by its own weight. However, if the coated stabilizer is placed in a one-eye hanging state, a trace (a flaw) may be left as a result of the hanger being in contact with the coating film, at an unspecified position of the suspended eye. Even though such a trace does not raise any practical problem in using the stabilizer, the fact that the trace (flaw) is left at the unspecified position of the eye is not desired by a person skilled in the art who is committed to manufacture a stabilizer of a supreme quality.

BRIEF SUMMARY OF THE INVENTION

Accordingly, an object of the present invention is to provide a vehicle stabilizer in which a coating film of the vehicle stabilizer having eyes on both ends can be kept in a preferable state, and which is of a higher quality.

A vehicle stabilizer according to one embodiment includes a stabilizer main body, a pair of eyes, a main body coating film which covers a surface of the stabilizer main body, an eye coating film which covers a surface of each of the eves and whose thickness is less than a thickness of the main body coating film, an inner surface coating film, and an incomplete coating portion. The stabilizer main body includes a torsion portion which is formed of a rod-shaped steel material (a steel pipe or a solid steel rod) and extends in a width direction of a vehicle, and a pair of arm portions connected from both ends of the torsion portion via bent portions. The eyes are formed on both ends of the stabilizer main body, and each of the eyes includes a flat fastening surface, and a through-hole which is open on the fastening surface. The inner surface coating film covers an inner surface of the through-hole. The incomplete coating portion is a part of the inner surface of the through-hole in a circumferential direction, and is located on an extension of a straight line connecting a center of the through-hole and the center of gravity of the stabilizer main body in a side view of the stabilizer main body. In the present embodiment, a thickness of a coating film of the incomplete coating portion may be less than a thickness of the inner surface coating film. Alternatively, the incomplete coating portion may include a steel member exposure portion where a part of a surface of the steel material is exposed.

In a manufacturing process, etc., of the stabilizer, hook members are used to hang the eyes on both ends of the stabilizer, respectively, and the stabilizer is suspended by its own weight. Consequently, each of the hook members is in contact with a specific part of the inner surface of the corresponding eye (i.e., on an extension of a straight line connecting the center of the through-hole of the eye and the center of gravity of the stabilizer main body in a side view of the stabilizer main body). Since the coated stabilizer includes an incomplete coating portion at the specific part of the inner surface of each of the eyes, a trace such as a flaw is not left at an unspecified place of the stabilizer, and the coating film of the stabilizer can be formed as desired.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A stabilizer for a vehicle according to a first embodiment will be described with reference to FIGS. 1 to 4A.

Figure 1:
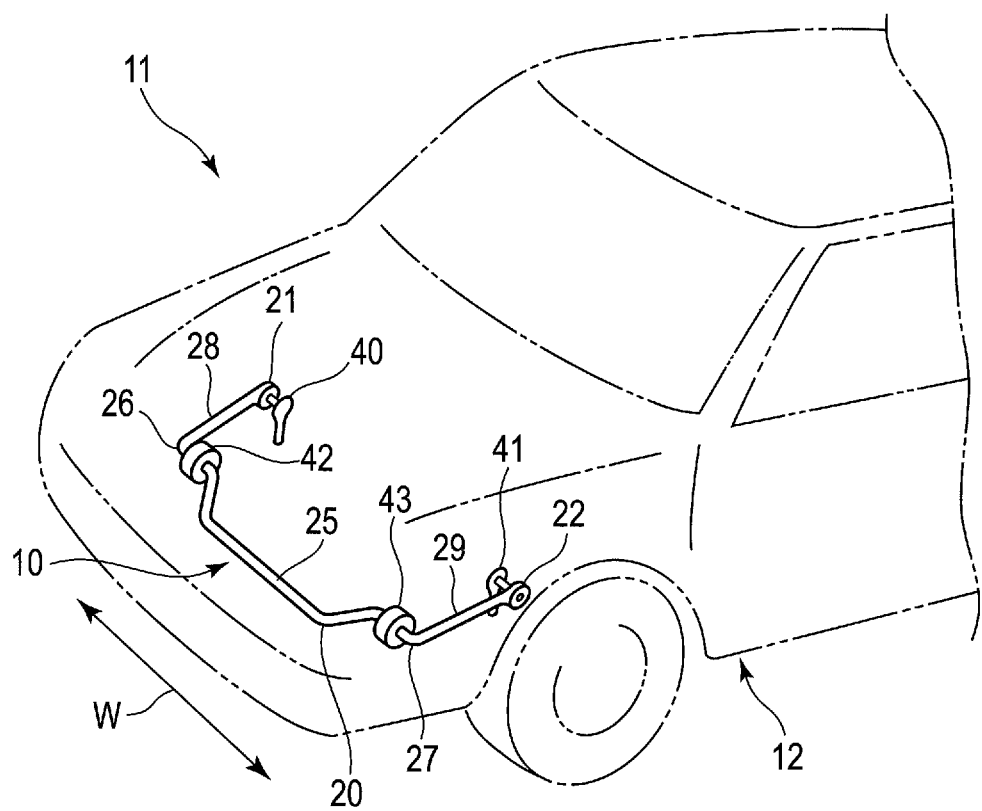
FIG. 1 is a perspective view showing a part of a vehicle and a stabilizer.
Figure 2:
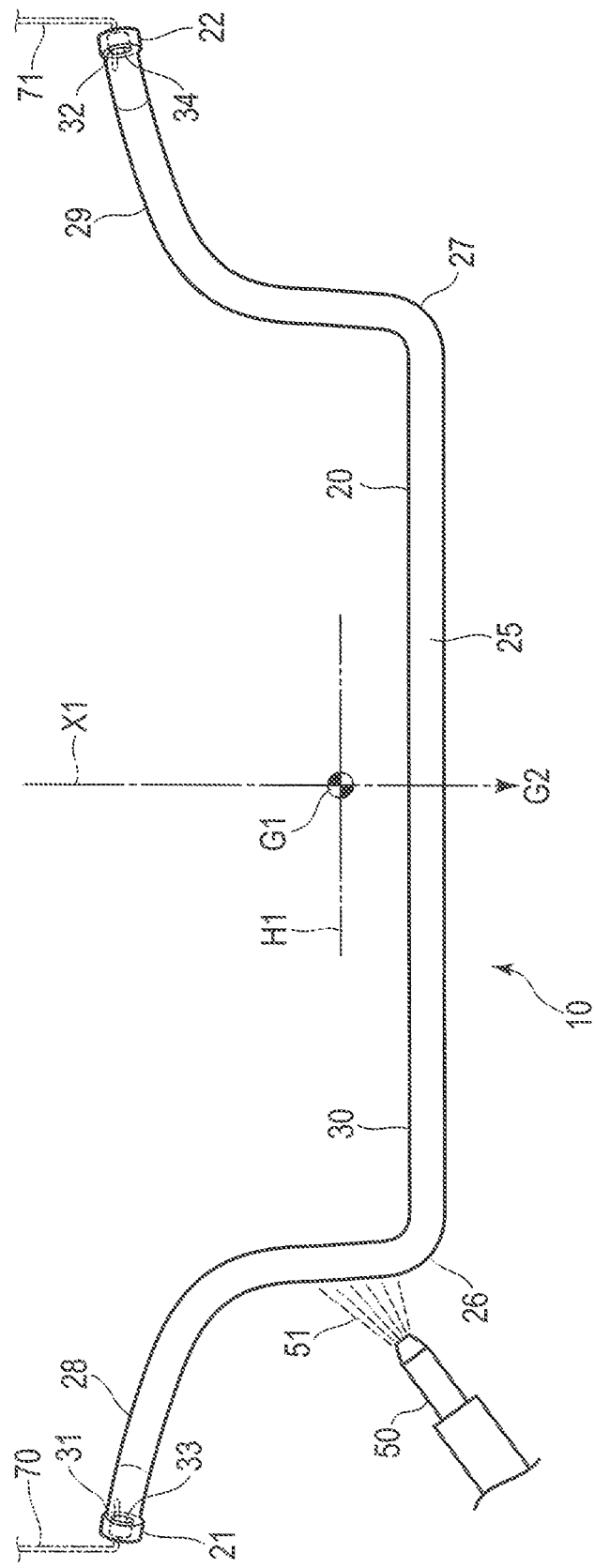
FIG. 2 is a front view of a stabilizer according to a first embodiment.
Figure 3:
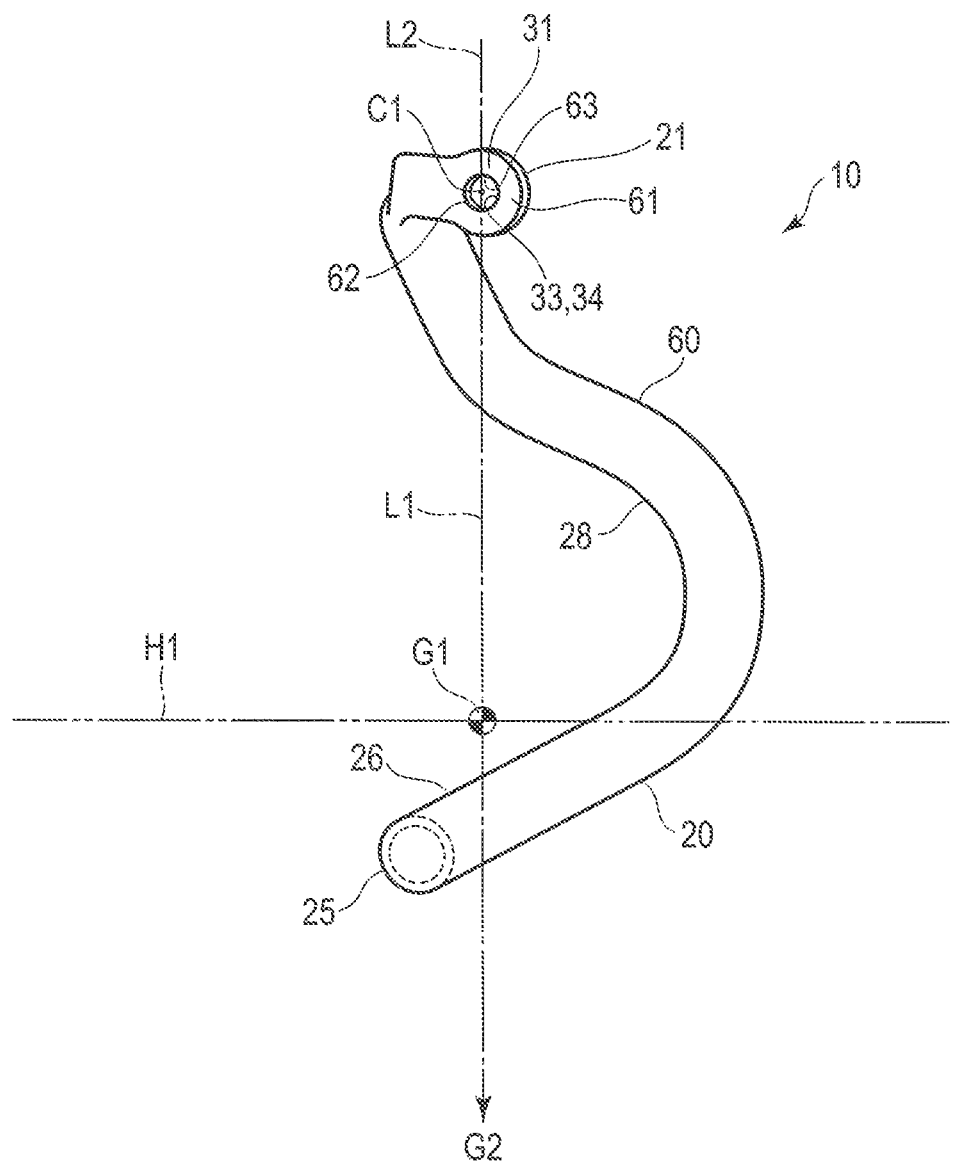
FIG. 3 is a side view of the stabilizer shown in FIG. 2.

FIG. 1 shows a part of a vehicle 11 comprising a vehicle stabilizer 10 (which may be simply referred to as a stabilizer in the present specification). The stabilizer 10 is arranged in a suspension mechanism part of the vehicle 11. FIG. 2 is a front view showing an example of the stabilizer 10 in a coating process. FIG. 3 is a side view (i.e., a view as seen from the side) of the stabilizer 10 shown in FIG. 2. The stabilizer 10 is bisymmetrical with respect to a symmetric axis X1 (FIG. 2).

The stabilizer 10 includes a stabilizer main body 20 made of a rod-shaped steel material, and a pair of eyes 21 and 22 formed integrally on both ends of the stabilizer main body 20. The stabilizer main body 20 includes a torsion portion 25, and arm portions 28 and 29. The torsion portion 25 extends in a width direction (i.e., a direction indicated by arrow N in FIG. 1) of a vehicle body 12. The arm portions 28 and 29 are continuous from the both ends of the torsion portion 25 through bent portions 26 and 27, respectively.

The stabilizer 10 is not limited to a planar configuration, and may include one or more bending portions in the torsion portion 25, or one or more bending portions in the arm portions 28 and 29, including a three-dimensional bent configuration. Also, the bent portions 26 and 27 may be configured to have a three-dimensional bent configuration, for example, and can be formed into various bent shapes.

The stabilizer 10 of the present embodiment is a hollow stabilizer. Accordingly, the material is a hollow steel material (steel pipe) 30, and is formed into a predetermined shape by a bending machine. An example of the steel material 30 is a steel pipe made of a type of steel capable of improving its strength by a heat treatment such as quenching, more specifically, using ASB25N or the like as the material. By flattening both ends of the steel material 30 (distal ends of the arm portions 28 and 29), the eyes 21 and 22 are formed. Note that in a case of a solid stabilizer as another embodiment, a solid steel rod is used as the material.

In the eyes 21 and 22, flat-shaped fastening surfaces 31 and 32, which are formed by plastic working (pressing) or machining, and circular through-holes 33 and 34 are formed. The eyes 21 and 22 intended in this specification refer to substantially circular areas including the fastening surfaces 31 and 32 formed around the through-holes 33 and 34, respectively. The through-holes 33 and 34 penetrate the eyes 21 and 22 in a thickness direction, and are open on the fastening surfaces 31 and 32.

In the through-holes 33 and 34, connecting members 40 and 41 (FIG. 1) such as bolts or stabilizer links are inserted. The connecting members 40 and 41 are fixed to the fastening surfaces 31 and 32 by a fixing member such as a nut. The arm portions 28 and 29 are connected to suspension arms of a suspension mechanism part, for example, via the connecting members 40 and 41, respectively.

The torsion portion 25 is supported by a part of the vehicle body 12 (such as a cross-member), for example, via a pair of support portions 42 and 43 (FIG. 1) comprising a rubber bushing, etc. Forces having opposite phases are input to the arm portions 28 and 29, such as when the vehicle 11 drives on a curve. At this time, a bending force is exerted on the arm portions 28 and 29, and bending and torsional force is exerted on the bent portions 26 and 27. As a result, because the torsion portion 25 is twisted and a repulsive load is produced, a rolling behavior of the vehicle body 12 is suppressed.

Coating is applied to a surface of the stabilizer 10. The coating is applied mainly for rust prevention of the steel material 30, and also in consideration of the appearance quality. The coating is performed by, for example, powder electrostatic coating (an electrostatic dry spray method) in a manufacturing process of the stabilizer 10. For example, as schematically illustrated in FIG. 2, powder paint 51, which is ejected together with air from a spray nozzle 50 is sprayed on the stabilizer 10, which is the objected to be coated.

The powder paint 51 includes paint particles (solid) formed of polymeric resin and a pigment (for example, a black pigment) as the main ingredients, and does not include an organic solvent. In the powder electrostatic coating, one electrode of a high-voltage DC power supply is connected to the steel material 30. The powder paint 51, together with pressurized air, is ejected toward the stabilizer 10 from the spray nozzle 50. The ejected powder paint 51 is electrically charged by the other electrode arranged in the spray adheres to the steel material 30 by electrostatic force. The stabilizer 10 to which the powder paint 51 adhered is placed in a heating furnace, and the powder paint 51 is baked at a high temperature. By doing so, curing reaction occurs in the paint, and a hard coating film which has been smoothed is fixed on a surface of the steel material 30.

Figure 4A:
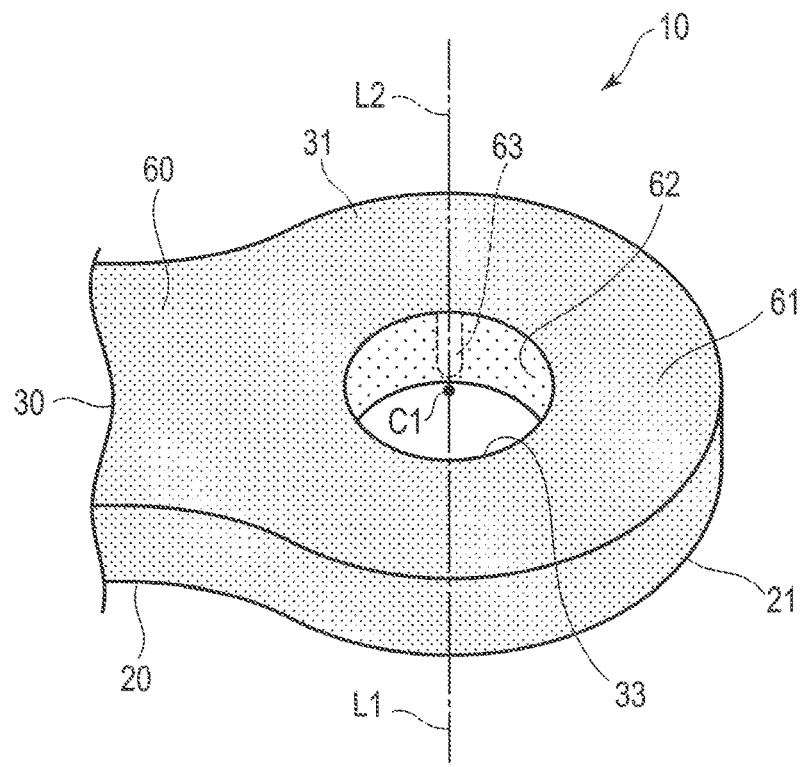
FIG. 4A is a perspective view of an eye of the stabilizer shown in FIG. 2.

FIG. 4A shows one of the eyes, i.e., the eye 21. The other eye 22 has a similar shape. Since the eyes 21 and 22 are bisymmetrical with respect to the symmetric axis X1 (FIG. 2), one of the eyes, i.e., the eye 21 shown in FIG. 4A, will be hereinafter described as a typical example of the eyes.

As shown in. FIG. 4A, the coated stabilizer 10 includes a main body coating film 60, an inner surface coating film 62, and an incomplete coating portion 63. The main body coating film 60 covers a surface of the stabilizer main body 20. An eye coating film 61 covers a surface of the eye 21. The inner surface coating film 62 covers an inner surface of the through-hole 33. The incomplete coating portion 63 is formed at a part of the inner surface of the through-hole 33 in a circumferential direction. The thickness of each of the eye coating film 61 and the inner surface coating film 62 is, for example, 10 to 20 μm. The thickness of the main body coating film 60 is, for example 40 to 120 μm. The thickness of each of the eye coating film 61 and the inner surface coating film 62 is less than that of the main body coating film 60. The thickness of the inner surface coating film 62 is less than or equal to that of the eye coating film 61.

In a side view of the stabilizer 10 as shown in FIG. 3, an imaginary straight line connecting a center C1 of the through-hole 33 and the center of gravity G1 of the stabilizer main body 20 is assumed as L1. The incomplete coating portion 63 is located on an extension L2 of this imaginary straight line L1. In the coating process, when the eyes 21 and 22 are supported by hook members 70 and 71 (FIG. 2), the stabilizer 10 is suspended by its own weight. In this state, each of the straight line L1 and the extension L2 conforms to a direction G2 representing gravity passing through the center of gravity G1 (i.e., a vertical line).

The incomplete coating portion 63 can be formed by using the hook members 70 and 71 (FIG. 2) which support the stabilizer 10 in the coating process of the stabilizer 10. The hook members 70 and 71 are inserted into the through-holes 33 and 34 of the eyes 21 and 22, and contact the inner surfaces of the through-holes 33 and 34, respectively.

When coating is performed for the whole of the stabilizer 10 by the powder electrostatic coating, etc., using a coating robot, a common paint adheres to the main body coating film 60 and the eye coating film 61. When the spraying is performed, time required for spraying the paint on the eye coating film 61 is made shorter than time required for spraying the paint on the main body coating film. 60. By doing so, the thickness of the eye coating film 61 can be made less than that of the main body coating film 60.

Figure 4B:
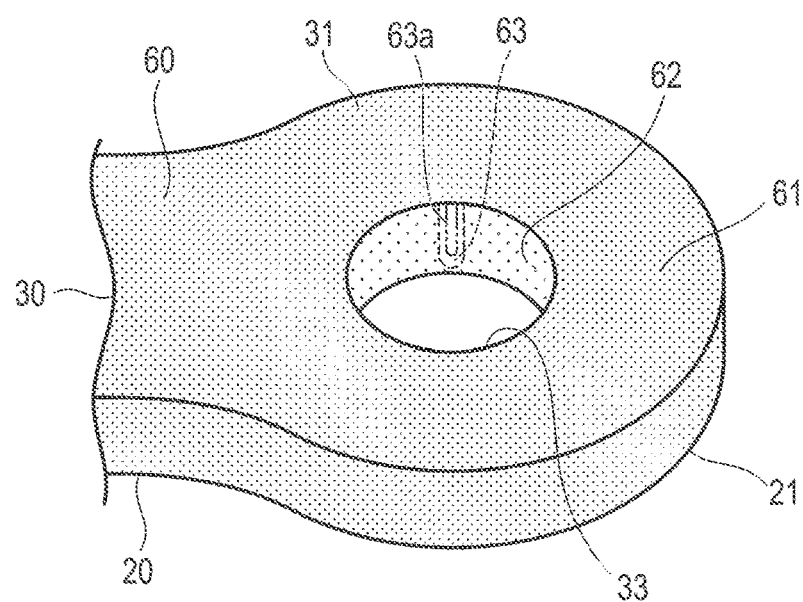
FIG. 4B is a perspective view of an eye showing another example of an incomplete coating film.

When the paint is sprayed on the eyes 21 and 22, since the same paint enters the inner surfaces of the through-holes 33 and 34, the inner surface coating film 62 is formed on each of the inner surfaces of the through-holes 33 and 34. The hook members 70 and 71 are in contact with the uppermost part of the inner surfaces of the through-holes 33 and 34. Accordingly, since the amount of adhesion of the paint in the vicinity of a place where the hook members 70 and 71 are brought into contact is small, the incomplete coating portion 63 is formed. Presence of the incomplete coating portion 63 can be visually checked. The paint may not adhere locally in the place where the hook members 70 and 71 are brought into contact. In such a case, as shown in FIG. 4B, a steel member exposure portion 63a where a part of a surface of the steel material. 30 is exposed may be formed at a part of the incomplete coating portion 63.

By suspending the eyes 21 and 22 on the both ends simultaneously, the stabilizer 10 can be supported on both ends in a horizontal position (i.e., a position in which the torsion portion 25 is along a horizontal plane H1). Accordingly, in the coating process, heights of the eyes 21 and 22 become equal to each other. Accordingly, even if airflow of the powder paint 51 which is sprayed toward the stabilizer 10 from the spray nozzle 50 is directed from top to bottom, it is possible to make the powder paint. 51 contact the respective eyes 21 and 22 substantially evenly. Thus, it is possible to prevent the thickness of the eye coating film 61 from becoming uneven in the eye 21 and the other eye 22. Further, it is possible to reduce variations in the thickness of the main body coating film 60 throughout the entire length of the stabilizer main body 20.

For some reason, it may be necessary to suspend the coated stabilizer 10. In such a case, the stabilizer 10 is suspended by its own weight in a state in which the hook members 70 and 71 are inserted into the through-holes 33 and 34 of the eyes 21 and 22 at the both ends, similarly in the coating process, as shown in FIGS. 2 and 3. More specifically, the stabilizer 10 can be held in such a state that it is suspended at both ends so that the torsion portion 25 is along the horizontal plane H1.

When the stabilizer 10 is hung in a state in which the eyes 21 and 22 on the both ends are supported as described above, the line t1 connecting the center C1 of the through-hole 33 or 34 and the center of gravity G1 conforms to the direction G2 representing gravity, as shown in FIG. 3. In other words, the hook members 70 and 71 are in contact with the uppermost part of the inner surfaces of the through-holes 33 and 34, respectively. Thus, the hook members 70 and 71 can be brought into contact with a specific place (the incomplete coating portion 63) of the eyes 21 and 22. Consequently, traces (flaws) of contact of the hook members 70 and 71 with the eyes 21 and 22 are not left, and the coating film of the coated stabilizer can be kept in a preferable state, which can be a proof of high quality.

In the present embodiment, by supporting the eyes 21 and 22 at the both ends by the hook members 70 and 71 simultaneously, the stabilizer 10 can be suspended in a substantially horizontal position. According to this support form (hanged by both ends), as compared to a case of hanging the stabilizer in a vertical position by one of the eyes as in the conventional stabilizer (i.e., by one-eye hang), an amount of swinging when the stabilizer 10 is swung is small. Accordingly, the stabilizer 10 can be held in a stable state.

Figure 5:
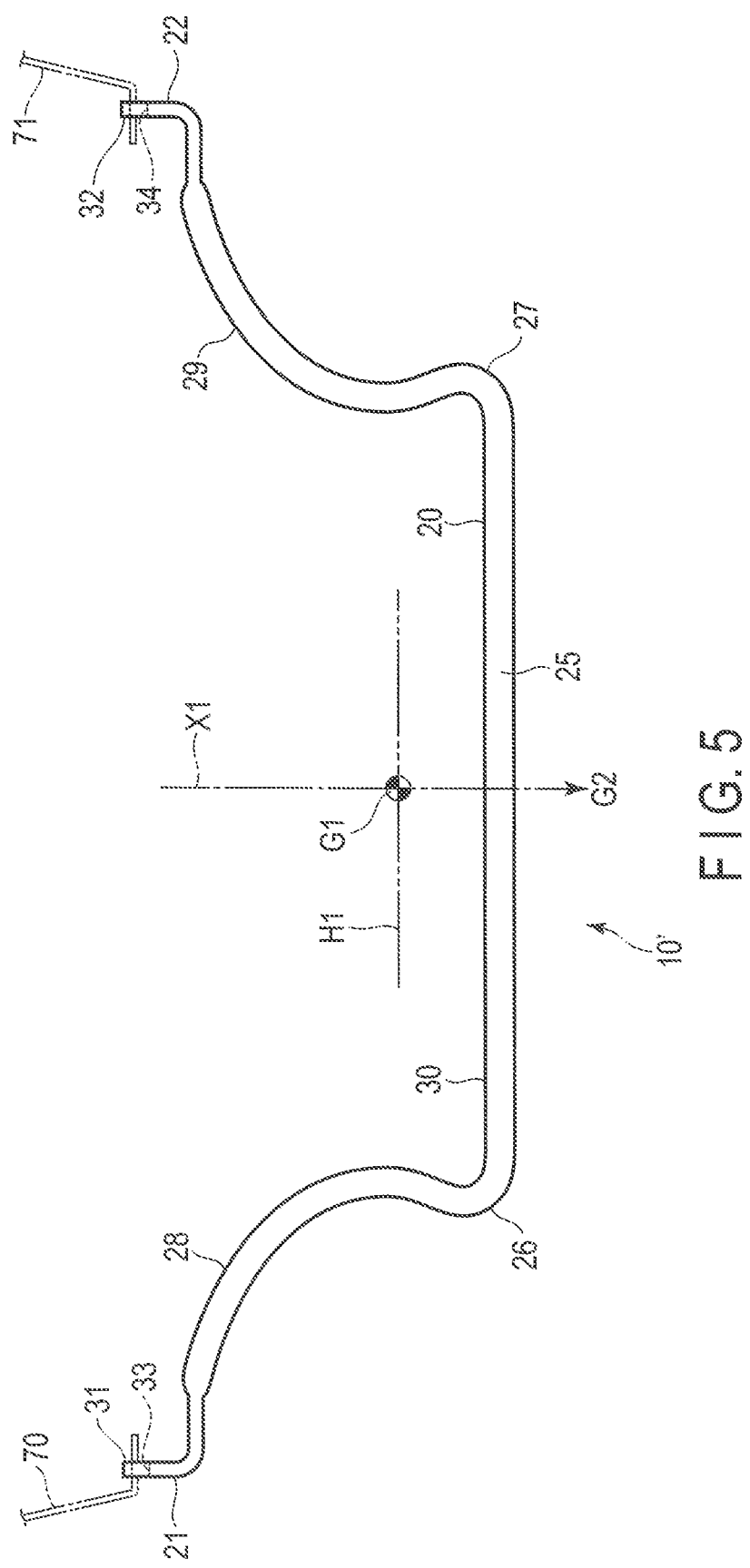
FIG. 5 is a front view of a stabilizer according to a second embodiment.
Figure 6:
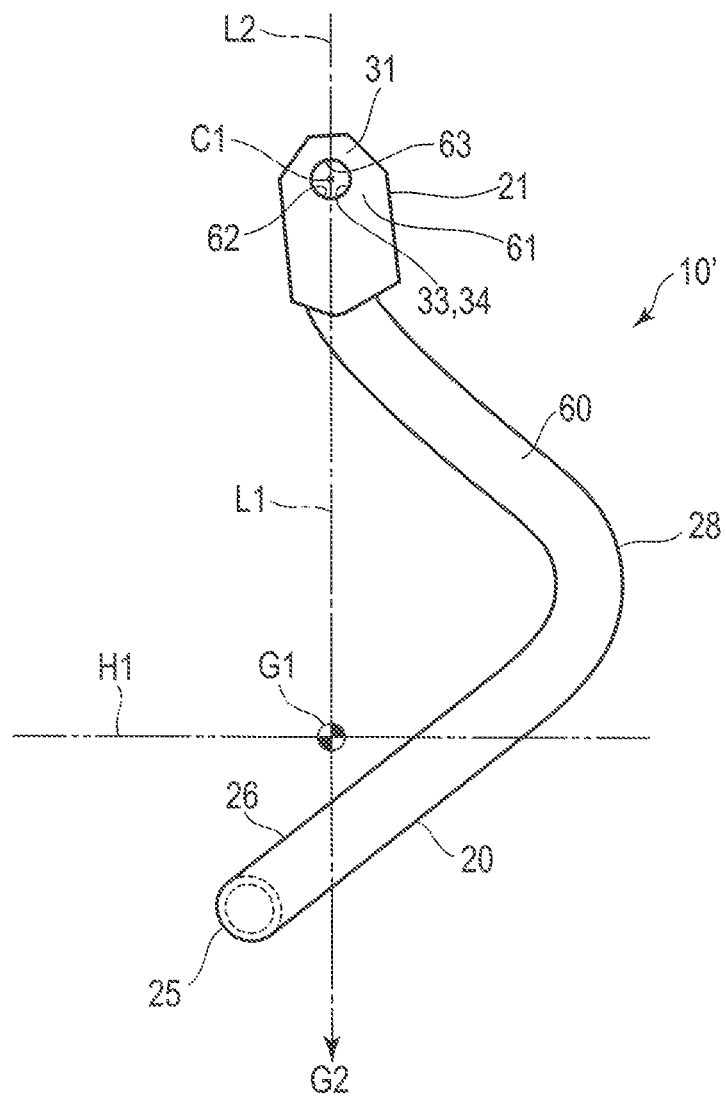
FIG. 6 is a side view of the stabilizer shown in FIG. 5.

FIGS. 5 and 6 show a stabilizer 10' according to a second embodiment. The stabilizer 10' includes a stabilizer main body 20, and a pair of eyes 21 and 22, likewise the stabilizer 10 of the first embodiment. In the eyes 21 and 22, flat fastening surfaces 31 and 32 and through-holes 33 and 34 are formed, respectively. Further, the stabilizer 10' includes, as in the first embodiment, a main body coating film 60 which covers the surface of the stabilizer main body 20, an eye coating film 61 which covers each of the surfaces of the eyes 21 and 22, an inner surface coating film 62 which covers each of the inner surfaces of the through-holes 33 and 34, and an incomplete coating portion 63. The incomplete coating portion 63 is formed at a part of the inner surface of each of the through-holes 33 and 34 in a circumferential direction. The incomplete coating portion 63 is located on an extension L2 of a straight line L1 connecting a center C1 of the through-hole 33 or 34 and the center of gravity C1 of the stabilizer main body 20, in a side view (FIG. 6) of the stabilizer main body 20.

As shown in FIG. 5, hook members 70 and 71 are inserted into the through-holes 33 and 34 of the eyes 21 and 22. When the stabilizer 10' is suspended by its own weight, the stabilizer 10' is hung in a position of suspension by both ends so that a torsion portion 25 is along a horizontal plane Hi. Accordingly, likewise the stabilizer 10 of the first embodiment, the stabilizer 10' can be held in a stable state with a small amount of swinging. Moreover, the stabilizer 10' is hung by its own weight in such a state that the hook members 70 and 71 are inserted into the through-holes 33 and 34 of the eyes 21 and 22, respectively. By doing so, the hook members 70 and 71 can be brought into contact with a specific place (the incomplete coating portion 63) of the eyes 21 and 22. Accordingly, traces of contact by the hook members 70 and 71 are not left at an unspecified place such as an outer surface of the eyes 21 and 22, and the coating film of the coated stabilizer can be protected.

In carrying out the present invention, the steel material, which is a material of the stabilizer, may be a solid material other than a hollow material (a steel pipe). Further, the coating film may be formed by coating means other than electrostatic dry coating (for example, by fluidized bed coating). Furthermore, needless to say, specific forms and arrangement or the like of the stabilizer main body and eyes can be modified variously according to a vehicle when implemented.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle stabilizer comprising:
   a stabilizer main body which is formed of a rod-shaped steel material, including a torsion portion which extends in a width direction of a vehicle, and a pair of arm portions connected from both ends of the torsion portion via bent portions;
   a pair of eyes formed on both ends of the stabilizer main body, each of the eyes including a flat fastening surface, and a through-hole which is open on the fastening surface;
   a main body coating film which covers a surface of the stabilizer main body;
   an eye coating film which covers a surface of each of the eyes and whose thickness is less than a thickness of the main body coating film;
   an inner surface coating film which covers an inner surface of the through-hole; and
   an incomplete coating portion, which is a part of the inner surface of the through-hole in a circumferential direction, and is located on an extension of a straight line connecting a center of the through-hole and a center of gravity of the stabilizer main body in a side view of the stabilizer main body.

2. The vehicle stabilizer of claim 1, wherein a thickness of a coating film of the incomplete coating portion is less than a thickness of the inner surface coating film.

3. The vehicle stabilizer of claim 2, wherein the incomplete coating portion includes a steel member material is exposed.

4. The vehicle stabilizer of claim 1, wherein the incomplete coating portion includes a steel member exposure portion where a part of a surface of the steel material is exposed.

* * * * *